April 12, 1932.   J. W. MONTGOMERY   1,853,739
ENTRAINMENT TRAP
Filed Sept. 16, 1929
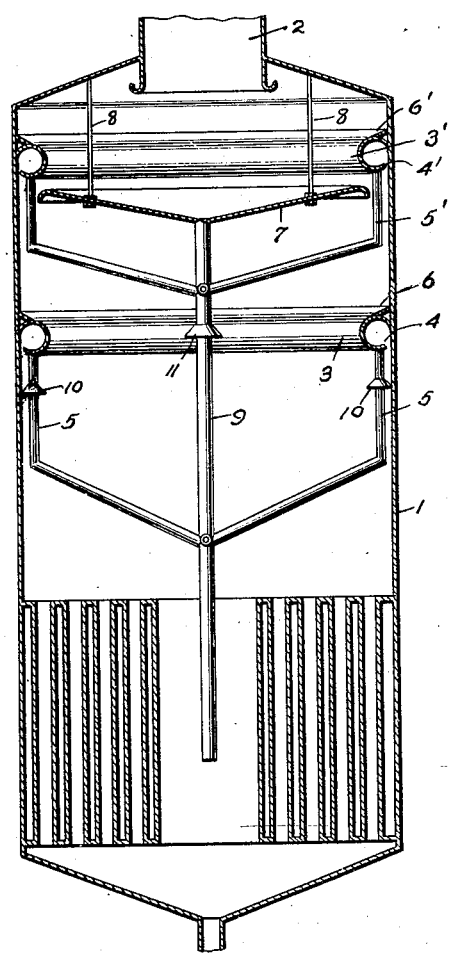
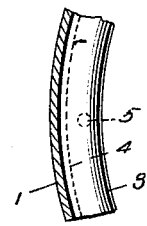
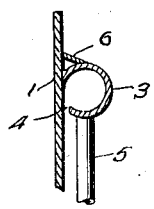
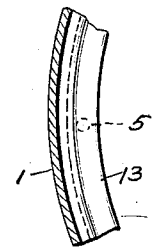
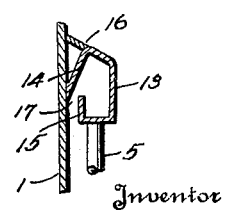

Patented Apr. 12, 1932

1,853,739

UNITED STATES PATENT OFFICE

JAMES W. MONTGOMERY, OF ELEELE, KAUAI, TERRITORY OF HAWAII

ENTRAINMENT TRAP

Application filed September 16, 1929. Serial No. 393,090.

The invention relates to means for separating foreign material such as liquids and solids from vapors, and more particularly to a form of apparatus for removing entrained liquids and the like from the vapors produced in vacuum pans, evaporators and the like employed in the sugar industry, to which end the novel device involves a conduit secured to the inner wall of the vapor chamber and having a slotted opening adjacent said wall, so that liquids tending to creep up the wall will be deflected into the conduit and will be drained from the latter by a suitable arrangement of piping, the aforesaid apparatus preferably being associated with an inverted cone-shaped plate located below the outlet of the evaporator and of somewhat less diameter than the latter, which is also provided with a drain pipe, preferably connected with the piping from the conduit aforesaid, to direct the liquid back into the boiler section of the evaporator.

The invention is illustrated in the accompanying drawings, in which;

Fig. 1 is a sectional elevation of an evaporator having the entrainment trap associated therewith.

Fig. 2 is a fragmentary plan view of one of the conduit members of the entrainment trap.

Fig. 3 is a sectional elevation thereof.

Figs. 4 and 5 are views similar to 2 and 3, illustrating a modification of the conduit.

As stated, the apparatus is designed to separate liquids or solids from the vapors generated in an evaporator or heater. It is a well known fact that, when liquid is vaporized, there is a general tendency for liquids or solids to be entrained or carried over with the vapors. This phenomenon is usually ascribed to: 1, the liquid creeping up the walls of the evaporator, due to capillarity; 2, the formation of bubbles, which when the velocity of the vapors exerts a force equal to the weight of the bubbles, causes the latter to be carried forward with the vapor, which action is known as vesicular transference; 3, the boiling liquid tends to cause the latter to splash into the vapor discharge pipe, whence it is carried forward.

The present invention is designed to overcome the entrainment of liquid in vapors due to any of the aforesaid causes, and to provide means for separating the entrained liquid from the vapors and to return the liquid to the boiling section of the evaporator.

Referring to the drawings, 1 indicates a typical form of evaporator, commonly employed in boiling sugar juices, and 2 indicates the vapor discharge pipe located at the top of the evaporator. Secured to the interior wall of the evaporator, preferably by welding or riveting, is a conduit 3, which may take the form of an annular pipe, provided with a peripheral slot 4 located above the bottom of the conduit and immediately adjacent the wall of the evaporator, so that any liquid tending to creep up the wall of the evaporator, passes into the conduit through the slotted opening 4 therein and is discharged from the conduit by means of pipes 5 connected to the bottom of the conduit. Preferably, in order to prevent a blind pocket above the annular conduit, the latter is provided with apron-like filler section 6, which is secured to the upper surface of the conduit 3 and to the wall of the evaporator.

Associated with the entrainment trap 3, which is preferably located well above the surface of the boiling liquid in the evaporator, and serving as a means for arresting and separating the liquid carried in the rising column of vapor, is an inverted conical plate 7, which is located above the trap 3 and below the outlet 2 of the evaporator, said plate 7 being of somewhat less diameter than the evaporator and, therefore, providing a restricted annular passage between the periphery of the plate and the wall of the evaporator. The plate 7 is conveniently suspended from the top of the evaporator by rods 8 which hold the plate rigidly centered within the evaporator. The lowermost portion of the inverted conical plate 7 communicates with the central discharge pipe 9, to which the several pipes 5 leading from the annular trap No. 3 are connected by suitable couplings, the pipe 9 extending into the lower portion of the evaporator to deliver the separated liquid back into the body of the boiling liquid. Preferably a second tubular trap member is located above the inverted conical plate 7, said trap member being in all respects similar to that heretofore described and comprising a tubular conduit 3' having a slotted opening 4' adjacent the wall of the vaporizer and being provided at intervals with drain pipes 5' which connect with the central discharge drain pipe 9. This annular conduit is also provided with an apron-like piece 6' connected to the upper portion thereof and to the wall of the evaporator.

In operation, any of the liquid which tends to creep up the lower portion of the wall of the evaporator, will be trapped by the annular conduit 3 and will be returned by the connected pipes 5 and 9 to the body of the liquid in the lower portion of the evaporator. However a considerable quantity of liquid may be carried bodily in the upward flow of vapor and, as the latter strikes the bottom of the inverted plate 7, it will be deflected towards the sides of the evaporator. In passing through the relatively narrow annular space between the peripheral edge of the cone 7 and the wall of the evaporator, the velocity of the vapors will be greatly increased and a large proportion of the liquid carried by the vapors will be thrown against the wall of the evaporator and, upon creeping up the wall, it will be caught by the upper tubular conduit 3', from which it is drained by the pipes 5" into the common discharge pipe 9. Upon passing into the space above the inverted conical plate 7, the velocity of the vapors will be considerably lowered and the particles of liquid, such as sugar juice, that may still be entrained in the vapors will fall onto the upper surface of the cone and will be returned to the main body of the liquid by the common drain pipe 9. The several pipes 5 and 9 are preferably provided with cone-like flanges 10 and 11, which prevent the liquid creeping on the outer surface of said pipes.

The provision of the inverted cone 7 in the relation indicated, is the reverse of the usual umbrella or cone employed in evaporators, and the present arrangement is much more efficient in that it materially reduces frictional resistance to the vapor current, and affords an effective surface upon which any bubbles will be readily broken.

As indicated the simplest form of the conduit member of the entrainment trap comprises a pipe bent to the form of a ring or annulus to fit the interior wall of the evaporator, said pipe having a peripheral slot formed therein adjacent the junction of the conduit with the walls of the evaporator. However under certain conditions it may be found advantageous to construct the conduit of a special form such as illustrated in Figs. 4 and 5, in which the body of the annular conduit 13 is of a general trough shape with a top section 14 which overhangs the upwardly extending wall 15 to provide a continuous annular slotted opening 17, the wall section 14 also serving as a means for securing the conduit to the inner wall of the evaporator either by welding or riveting. A filler strip 16 is secured between the upper surface of the pipe 13 and the wall of the evaporator to prevent the formation of a pocket in which foreign material would tend to accumulate. This particular form of conduit is disposed and arranged in a manner precisely similar to that heretofore described, and is adapted to be connected at intervals to pipes 5 which are in turn connected with a common central discharge pipe.

What I claim is:—

1. An entrainment trap, comprising a tubular conduit extending circumferentially around the inner periphery of the wall of a vapor chamber and secured directly to said wall throughout its length and having a slot extending throughout its length above its bottom and contiguous to said wall, and means for draining said conduit, the diameter of said conduit being of such size relative to the internal diameter of said vapor chamber as to allow substantially unobstructed flow of vapor through said chamber.

2. An entrainment trap, comprising a tubular conduit extending circumferentially around the inner periphery of the wall of a vapor chamber and secured directly to said wall throughout its length and having a slot extending throughout its length above its bottom and contiguous to said wall, pipes connected to the bottom of said conduit for draining the latter, the diameter of said conduit being of such size relative to the internal diameter of said vapor chamber as to allow substantially unobstructed flow of vapor through said chamber.

3. An entrainment trap for evaporators, comprising a tubular conduit extending circumferentially around the inner periphery of the wall of a vapor chamber and secured directly to said wall throughout its length and having a slot extending throughout its length above its bottom and contiguous to said wall, an inverted conical plate of less diameter than the vapor chamber mounted below the outlet of the latter, and pipes connected to the bottom of the conduit and conical plate to return the separated material to the lower portion of the evaporator, the diameter of said conduit being of such size relative to the internal diameter of said vapor chamber as to allow substantially unobstructed flow of vapor through said chamber.

4. An entrainment trap for evaporators, comprising an inverted conical plate of less diameter than the evaporator mounted below the outlet of the latter, tubular conduits disposed above and below said conical plate, each of said tubular conduits extending circumferentially around the inner periphery of the wall of the evaporator and secured directly to said wall throughout its length and having a slot extending throughout its length above its bottom and contiguous to said wall, and drain pipes leading from the bottoms of the conical plate and the conduits to the lower portion of the evaporator, the diameters of said conduits being of such size relative to the internal diameter of the evaporator as to allow substantially unobstructed flow of vapor through said chamber.

In testimony whereof I affix my signature.

JAMES W. MONTGOMERY.